(12) United States Patent
Freedman

(10) Patent No.: US 8,954,578 B2
(45) Date of Patent: Feb. 10, 2015

(54) SYSTEM AND METHOD FOR HEURISTIC DETERMINATION OF NETWORK PROTOCOLS

(75) Inventor: Jerome N. Freedman, Greenbrae, CA (US)

(73) Assignee: McAfee Inc., Santa Clara, CA (US)

(*) Notice: Subject to any disclaimer, the term of this patent is extended or adjusted under 35 U.S.C. 154(b) by 0 days.

(21) Appl. No.: 13/561,428

(22) Filed: Jul. 30, 2012

(65) Prior Publication Data

US 2013/0031265 A1 Jan. 31, 2013

Related U.S. Application Data

(63) Continuation of application No. 10/206,679, filed on Jul. 26, 2002, now Pat. No. 8,260,906.

(51) Int. Cl.
*G06F 15/173* (2006.01)
*H04L 12/26* (2006.01)

(52) U.S. Cl.
CPC ................................ *H04L 43/18* (2013.01)
USPC .................................. 709/224; 709/223

(58) Field of Classification Search
CPC ......... H04L 43/04; H04L 43/08; H04L 43/50; H04L 47/805; G06F 11/3065
USPC ................................................ 709/224, 223
See application file for complete search history.

(56) References Cited

U.S. PATENT DOCUMENTS

| | | | |
|---|---|---|---|
| 5,347,524 A | 9/1994 | L'Anson et al. | |
| 5,737,520 A | 4/1998 | Grondlund et al. | |
| 5,987,610 A | 11/1999 | Franczek et al. | |
| 6,044,402 A | 3/2000 | Jacobson et al. | |
| 6,073,142 A | 6/2000 | Geiger et al. | |
| 6,105,068 A | 8/2000 | Naudus | |
| 6,108,734 A | 8/2000 | Shand | |
| 6,182,146 B1* | 1/2001 | Graham-Cumming, Jr. | 709/238 |
| 6,363,384 B1 | 3/2002 | Cookmeyer, II et al. | |
| 6,453,360 B1* | 9/2002 | Muller et al. | 709/250 |
| 6,457,051 B1 | 9/2002 | Riddle et al. | |
| 6,460,050 B1 | 10/2002 | Pace et al. | |
| 6,529,934 B1 | 3/2003 | Kawamura et al. | |
| 6,529,954 B1 | 3/2003 | Cookmeyer et al. | |
| 6,651,099 B1* | 11/2003 | Dietz et al. | 709/224 |
| 6,728,243 B1 | 4/2004 | Jason et al. | |
| 6,895,020 B2* | 5/2005 | Morris et al. | 370/474 |
| 6,931,574 B1* | 8/2005 | Coupal et al. | 714/39 |
| 6,944,670 B2 | 9/2005 | Krichevski et al. | |
| 6,968,554 B1 | 11/2005 | Macdonald et al. | |
| 7,016,951 B1 | 3/2006 | Longworth et al. | |
| 7,050,437 B2* | 5/2006 | Bilic et al. | 370/394 |
| 7,480,707 B2* | 1/2009 | Morlitz | 709/223 |

(Continued)

FOREIGN PATENT DOCUMENTS

WO         98/52133         11/1998

*Primary Examiner* — Edward Kim
(74) *Attorney, Agent, or Firm* — Patent Capital Group

(57) ABSTRACT

A system, method and computer program product are provided for heuristically identifying protocols during network analysis utilizing a network analyzer. First provided is a sequencing and reassembly (SAR) engine module for sequencing and/or re-assembling network communications. Coupled to the engine module is a plurality of protocol interpreter modules for interpreting protocols associated with the network communications. At least one of the protocol interpreter modules is adapted for heuristically identifying protocols associated with the network communications.

25 Claims, 7 Drawing Sheets

(56) References Cited

U.S. PATENT DOCUMENTS

| | | |
|---|---|---|
| 7,506,155 B1 | 3/2009 | Stewart et al. |
| 2001/0048681 A1* | 12/2001 | Bilic et al. .................... 370/389 |
| 2002/0012329 A1* | 1/2002 | Atkinson et al. ............. 370/330 |
| 2002/0046348 A1 | 4/2002 | Brustoloni |
| 2002/0059622 A1 | 5/2002 | Grove et al. |
| 2002/0133588 A1 | 9/2002 | Doyle et al. |
| 2002/0136217 A1 | 9/2002 | Christensen |
| 2002/0174208 A1* | 11/2002 | Morlitz ......................... 709/223 |
| 2002/0196782 A1 | 12/2002 | Furukawa et al. |
| 2003/0026251 A1 | 2/2003 | Morris et al. |
| 2003/0140137 A1 | 7/2003 | Joiner et al. |

* cited by examiner

| PRIORITY | PROTOCOL |
|---|---|
| 1 | Protocol_1 |
| 2 | Protocol_2 |
| 3 | Protocol_3 |
| 4 | Protocol_4 |
| 5 | Protocol_5 |
| 6 | Protocol_6 |
| 7 | Protocol_7 |
| 8 | Protocol_8 |
| 9 | Protocol_9 |
| 10 | Protocol_10 |
| 11 | Protocol_11 |
| 12 | Protocol_12 |
| 13 | Protocol_13 |
| 14 | Protocol_14 |
| 15 | Protocol_15 |

FIG. 5

| PORT NUMBER | PROTOCOL |
|---|---|
| 20 | FTP-data |
| 21 | FTP-ctrl |
| 23 | TELNET |
| 25 | SMTP |
| 37 | TIME |
| 67 | BOOTPS/DHCP |
| 68 | BOOTPC/DHCP |
| 69 | TFTP |
| 70 | GOPHER |
| 79 | FINGER |
| 80 | WWW/WWW-HTTP/HTTP |
| 110 | POP3 |
| 111 | SUN RPC |
| 119 | NNTP |
| 443 | HTTPS |

| FIG. 7 |
|---|
| FIG. 7A |
| FIG. 7B |

Sniffer - Local, Ethernet (Line speed at 10 Mbps) - [Snif1 : 5/6 Ethernet frames]

File  Monitor  Capture  Display  Tools  Database  Window  Help

700

| No. | Status | Source Address | Dest Address | Summary | Len |
|---|---|---|---|---|---|
| 1 | M | [161.69.2.16] | [161.69.13.103] | DLC: Ethertype=0800  size=566 bytes<br>IP:  D=[161.69.13.103] S=[161.69.2.16] LEN=532 ID=50972<br>TCP: D=2033 S=2824  ACK=602816001 SEQ=1356032001 LEN=512 WIN=8192<br>TDS: Login record | 566 |
| 2 | | [161.69.2.16] | [161.69.13.103] | DLC: Ethertype=0800  size=126 bytes<br>IP:  D=[161.69.13.103] S=[161.69.2.16] LEN=92 ID=50973<br>TCP: D=2033 S=2824  ACK=602816001 SEQ=1356032513 LEN=32 WIN=8192<br>TDS: Continuation of frame 1, 72 Bytes of data | 126 |
| 3 | | [161.69.13.103] | [161.69.2.16] | DLC: Ethertype=0800  size=257 bytes<br>IP:  D=[161.69.2.16] S=[161.69.13.103] LEN=223 ID=15519<br>TCP: D=2824 S=2033  ACK=1356032585 SEQ=602318001 LEN=204 WIN=8192<br>TDS: Response to a command | 257 |
| 4 | | [161.69.2.16] | [161.69.13.103] | DLC: Ethertype=0800  size=188 bytes<br>IP:  D=[161.69.13.103] S=[161.69.2.16] LEN=154 ID=50975<br>TCP: D=2035 S=5821  ACK=602816204 SEQ=1456082535 LEN=134 WIN=8192<br>TDS: Language command<br>TDS: select name, type, id, crdate from sysobjects where type = 'S' select<br>TDS:        type, id, crdate from sysobjects where type = 'P' | 188 |
| 5 | | [161.69.13.103] | [161.69.2.16] | DLC: Ethertype=0800  size=566 bytes<br>IP:  D=[161.69.2.16] S=[161.69.13.103] LEN=532 ID=45567<br>TCP: D=3824 S=2033  ACK=1356032719 SEQ=602816204 LEN=512 WIN=8192<br>TDS: Response to a command | 566 |
| 6 | | [161.69.13.103] | [161.69.2.16] | DLC: Ethertype=0800  size=621 bytes<br>IP:  D=[161.69.2.16] S=[161.69.13.103] LEN=587 ID=40533<br>TCP: D=3824 S=2033  ACK=1356032719 SEQ=6022815716 LEN=567 WIN=8192 | 621 |

Default

TO FIG. 7B

SYSTEM AND METHOD FOR HEURISTIC DETERMINATION OF NETWORK PROTOCOLS

RELATED APPLICATION

This Application is a continuation (and claims the benefit of priority under 35 U.S.C. §120) of U.S. application Ser. No. 10/206,679, filed Jul. 26, 2002, now U.S. Pat. No. 8,260,906 entitled "SYSTEM AND METHOD FOR HEURISTIC DETERMINATION OF NETWORK PROTOCOLS," Inventor Jerome N. Freedman. The disclosure of the prior application is considered part of (and is incorporated by reference in) the disclosure of this application.

FIELD OF THE INVENTION

The present invention relates to heuristic techniques and more particularly to the use of heuristic techniques during network analysis.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network communications, detecting bottlenecks and problems. Using this information, a network manager can keep communications flowing efficiently. A network analyzer may also be used to capture data being transmitted on a network. The term "network analyzer" may further be used to describe a program that analyzes data other than network communications, or may also be used to classify packets into flows. For example, a database can be analyzed for certain kinds of duplication, etc. One specific example of a network analyzer is the SNIFFER® network analyzer manufactured by NETWORK ASSOCIATES, INC®.

Prior Art FIG. 1A illustrates a network analyzer 10, in accordance with the prior art. Such network analyzer 10 produces protocol decodes and allows application and response time monitoring for the purpose of solving network problems, etc. To accomplish this, the network analyzer 10 includes a sequencing and reassembly (SAR) module 12 for sequencing and reassembling frames of gathered network communications.

The basis for the SAR module 12 may be an architectural model involving a flow database. The flow database records data flows from network connections at each layer of the open systems interconnection (OSI) model upon which most protocols depend or may be mapped. For example, connections between two network interface cards (NIC) (physical layer) are components of the flow database. The network topology determines the data link control layer (DLC), which is also registered in the flow database. On top of the DLC layer is the network layer (e.g., IP), which also contributes to the flow database. This model continues up the protocol stack to the application layer, where protocols such as Sybase/Microsoft® SQL Server, Oracle® SQL Server, HTTP, etc. may be found.

Coupled to the SAR module 12 is a suite of a plurality of protocol interpreter modules 14. The protocol interpreter modules 14 are adapted for interpreting or translating protocol frames for the purpose of being sequenced and reassembled by the SAR module 12. Often such protocol interpreter modules 14 are typically added to the SAR module 12 to handle desired protocols. It should be noted that the protocol interpreter modules 14 may be selectively disabled/enabled as needed in a given situation.

Each of the protocol interpreter modules 14 further includes a registration module 15. Upon initiation of the network analyzer 10, each registration module 15 registers the associated protocol interpreter modules 14 in the suite and indicates to the SAR module 12 how the corresponding protocol should be reassembled, etc.

In use, the network analyzer 10 must be able to identify the particular protocols associated with gathered network communications so that the appropriate analysis may be carried out. Many familiar protocols are transported over transmission control protocol/internet protocol (TCP/IP) using what are known as "well-known" port numbers, or "registered" port numbers. Traditionally, a port number is a field in a TCP header. Other protocols, such as Oracle®, Sybase® and Microsoft® SQL database servers are not necessarily on well-known or registered ports. Instead, these protocols may appear on what are known as "dynamic" port numbers. The solution to the problem of identifying a protocol when known protocols are run on unfamiliar ports or use dynamic ports is a process of heuristics.

Such heuristics often employ various aspects of network communications. For example, many dynamic port protocols have well-defined headers preceding the data portion of a protocol data unit (PDU). Prior Art FIG. 1B illustrates an exemplary header 20 with which typical packets start. As shown, the header 20 may include a packet type field 22, last packet indicator 24 field, packet size field 26, channel field 28, packet number field 30, and a window field 32. In use, the PDU is transported from an end user computer to a server computer in the form of one or more request packets. Such PDU is further transported from the server computer to the end user computer in the form of one or more reply packets.

To heuristically determine if the protocol in a given packet is in a particular format [i.e. tabular data stream (TDS)], the network analyzer 10 may examine the header 20 as well as apply other knowledge about the protocol for protocol decoding. For example, the network analyzer 10 may validate that the packet type is within a specified range, and/or the packet size is appropriate for the particular format. Other tests may be conducted depending on the packet type, last packet indicator, and other fields as necessary. The foregoing analysis may return a TRUE response if the packet can be identified as TDS, or a FALSE response otherwise.

Typically, the foregoing heuristic techniques are carried out by a heuristic module 13 which is resident in the SAR module 12. Unfortunately, such framework has many drawbacks.

By way of example, when a particular protocol interpreter module 14 is disabled in the aforementioned manner, the heuristic module 13 still does any associated heuristic tests. This unnecessary processing results in decreased performance. Moreover, when additional protocol interpreter modules 14 are coupled to the SAR module 12 and additional heuristic techniques are required, significant reworking of the SAR module 12 and the associated heuristic module 13 is required. Therefore, such prior art network analyzer 10 simply lacks any type of modularity and/or portability.

There is thus a need for a network analyzer which overcomes these and other shortcomings in the prior art.

DISCLOSURE OF THE INVENTION

A system, method and computer program product are provided for heuristically identifying protocols during network analysis utilizing a network analyzer. First provided is a sequencing and reassembly (SAR) engine module for sequencing and/or re-assembling network communications. Coupled to the engine module is a plurality of protocol interpreter suites with protocol interpreter modules for interpreting protocols associated with the network communications. At least one of the protocol interpreter modules is adapted for heuristically identifying protocols associated with the network communications.

By positioning the heuristic capabilities in the protocol interpreter module(s), performance is improved. Moreover, the system is more modular in that the heuristic capabilities may be tailored along with the protocol interpreter module(s).

For example, the protocol interpreter module(s) may be adapted for heuristically identifying protocols associated with the network communications utilizing a plurality of heuristic functions. Such heuristic functions may be organized in a table. Still yet, the table may be populated upon the initiation of the network analyzer.

As an option, the heuristic functions may be organized in the table based on a priority. Such priority may control the order in which the heuristic functions are called.

In another embodiment, the protocol interpreter module may be further adapted for identifying the protocols associated with the network communications based on a port number.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings.

Prior Art

Prior Art

FIG. 5 illustrates an exemplary heuristic table including a plurality of heuristic function calls with an associated priority.

FIG. 6 illustrates an exemplary registered port table including a plurality of registered or "well known" ports with an associated protocol.

DESCRIPTION OF THE PREFERRED EMBODIMENTS

Figure 1A:
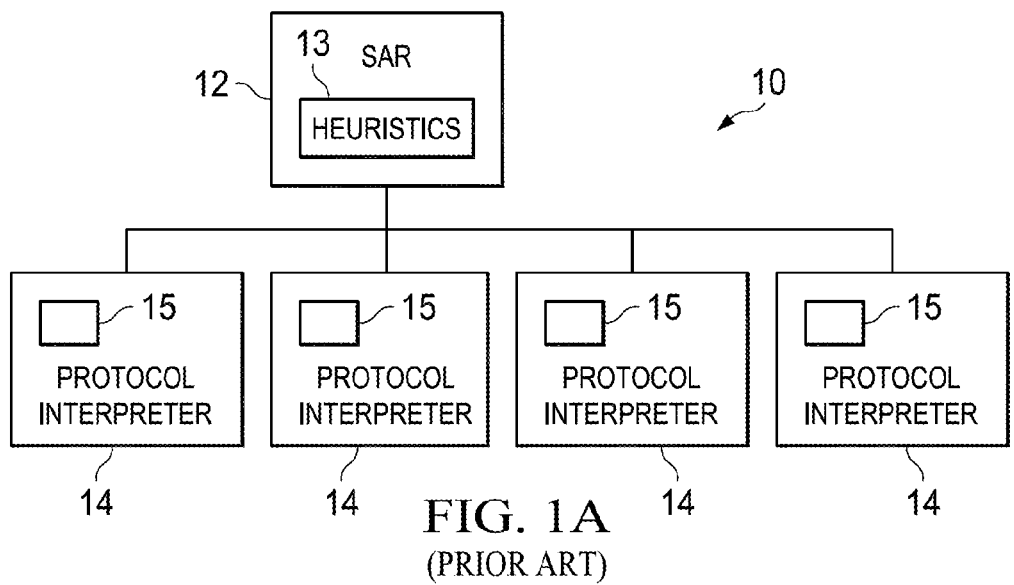
FIG. 1A illustrates a network analyzer, in accordance with the prior art.
Figure 1B:
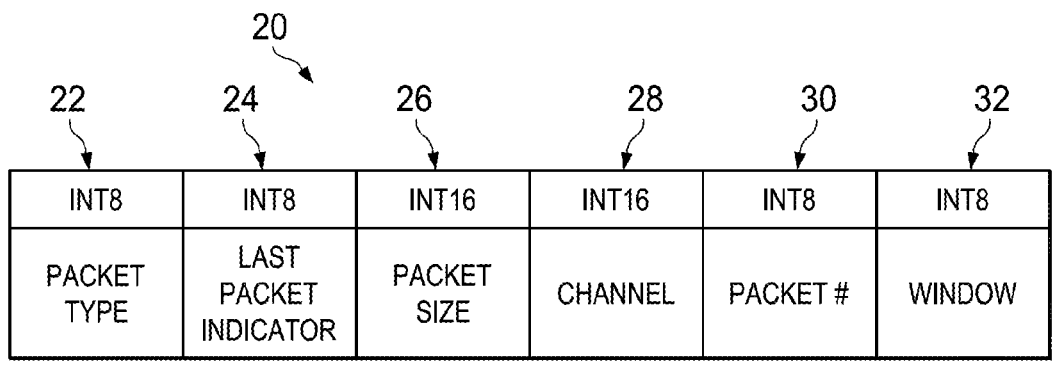
FIG. 1B illustrates an exemplary header with which typical packets start, in accordance with the prior art.
Figure 1C:
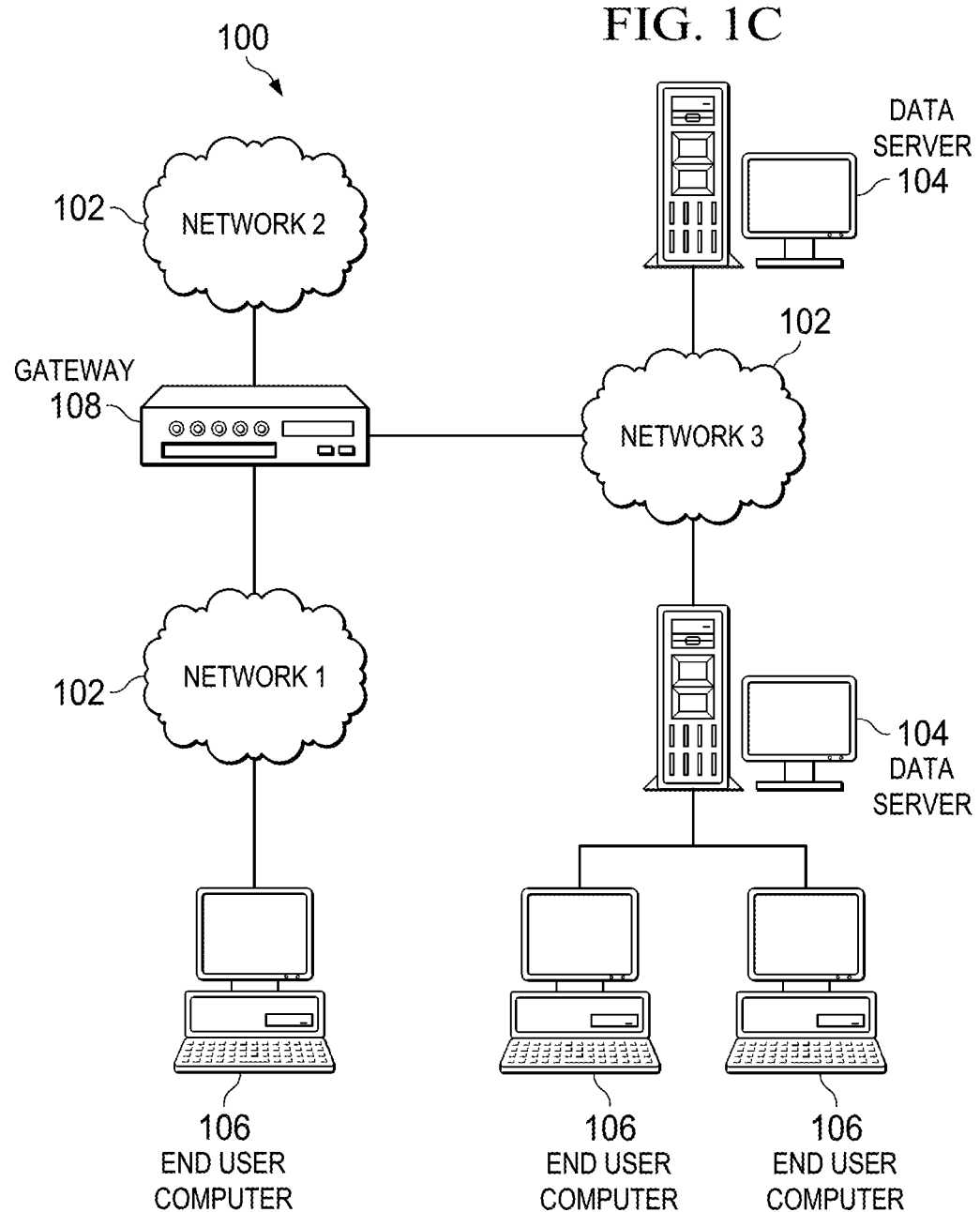
FIG. 1C illustrates a network architecture, in accordance with one embodiment.

FIG. 1C illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway 108 is coupled therebetween. It should be noted that each of the foregoing network devices as well as any other unillustrated devices may be interconnected by way of a plurality of network segments.

Coupled to any one of the foregoing devices and/or segments may be a network analyzer. One exemplary network analyzer that may be used is the SNIFFER® network analyzer manufactured by NETWORK ASSOCIATES, INC®. In use, the network analyzer is generally adapted for monitoring and analyzing network communications, detecting bottlenecks, abnormal traffic, problems, etc. To accomplish this, the network analyzer may be capable of decoding protocols. Furthermore, the network analyzer may be capable of various security functionality (i.e. intrusion detection, virus scanning, firewalling, etc.). More information regarding such a network analyzer will be set forth with reference to subsequent figures.

Figure 2:
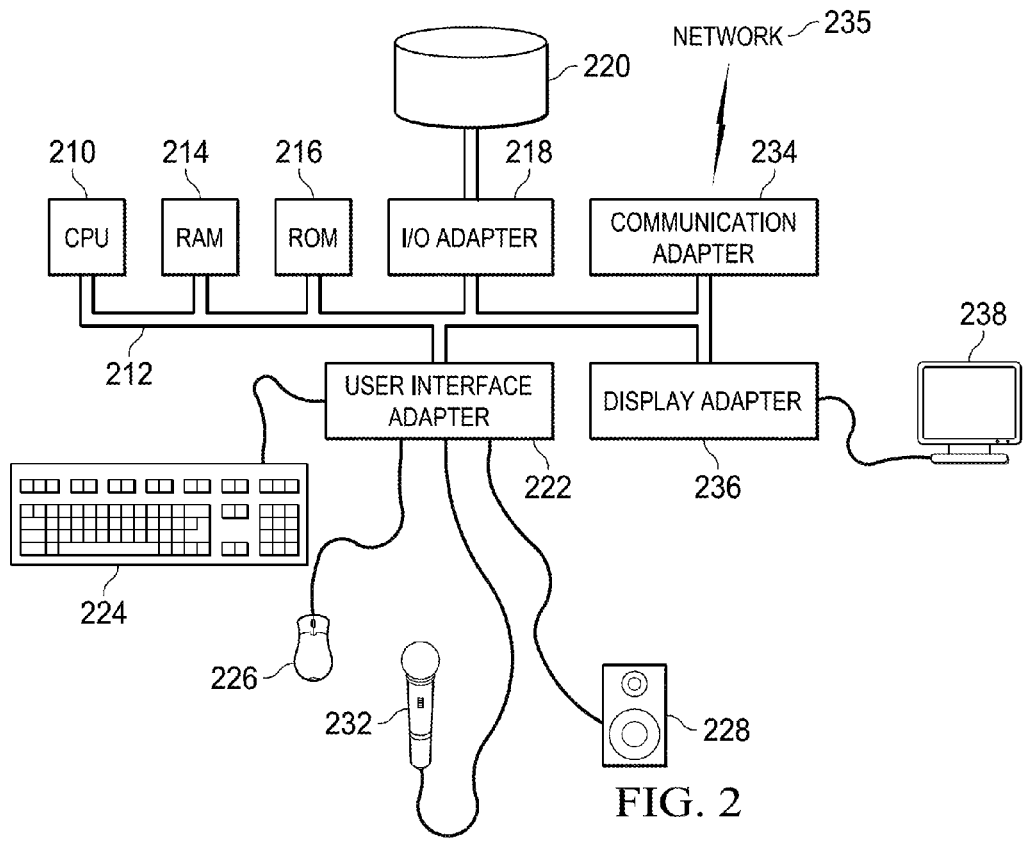
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
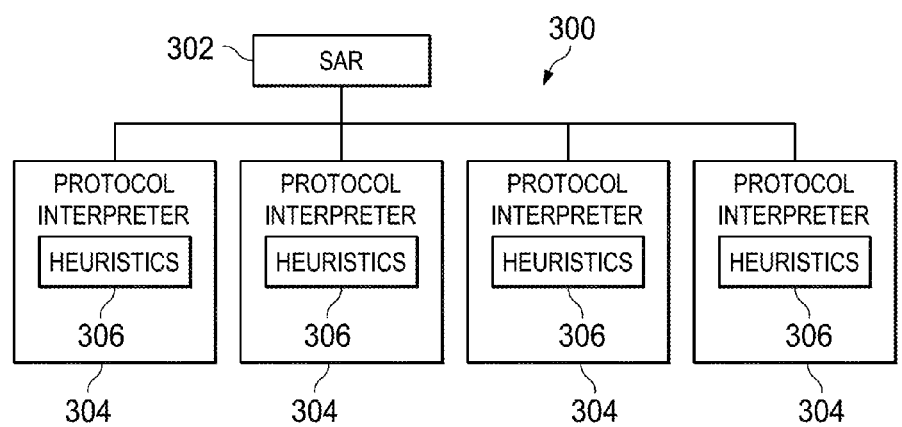
FIG. 3 illustrates a network analyzer with the capability of heuristically identifying network protocols.

FIG. 3 illustrates a network analyzer 300 with the capability of heuristically identifying network protocols. Such network analyzer 300 produces protocol decodes and allows application and response time monitoring for the purpose of solving network problems, etc.

To accomplish this, the network analyzer 300 includes a sequencing and reassembly (SAR) module 302 or "engine" for reconstructing network communications (i.e. frames, packets, any aspect of communication over a network, etc.). The basis for the SAR module 302 may be an architectural model involving a flow database.

Coupled to the SAR module 302 is a plurality of protocol interpreter modules 304. The protocol interpreter modules 304 may include any logic (i.e. software, hardware, etc.) adapted for interpreting, or "translating," network communications in association with the sequencing and reassembling of the SAR module 302. In use, such protocol interpreter modules 304 are typically selectively added to the SAR module 302 to handle desired protocols. Moreover, the protocol interpreter modules 304 may be selectively disabled/enabled as needed in a given situation.

Each of the protocol interpreter modules 304 is equipped with a registration module 306 with heuristic capabilities. Upon initiation of the network analyzer 300, each registration module 306 registers the associated protocol interpreter module 302 and indicates to the SAR module 304 how the corresponding protocol should be handled (i.e. reassembled, etc.). Still yet, the registration modules 306 are capable of equipping the associated protocol interpreter modules 302 with the ability to heuristically identify protocols of network communications using heuristic methods.

Thus, the protocol interpreter modules 304 may be adapted for heuristically identifying protocols associated with the network communications utilizing a plurality of heuristic functions. Such heuristic functions may be organized in a table. Still yet, the table may be populated upon initiation of the network analyzer 300. As an option, the heuristic functions may be organized in the table based on a priority. Such priority may control the order in which the heuristic functions are called.

In one embodiment, the protocol interpreter modules 304 may be further adapted for identifying the protocols associated with the network communications based on a port number. More information regarding the foregoing options will be set forth in greater detail during reference to an exemplary embodiment set forth in the following figures.

Figure 4:
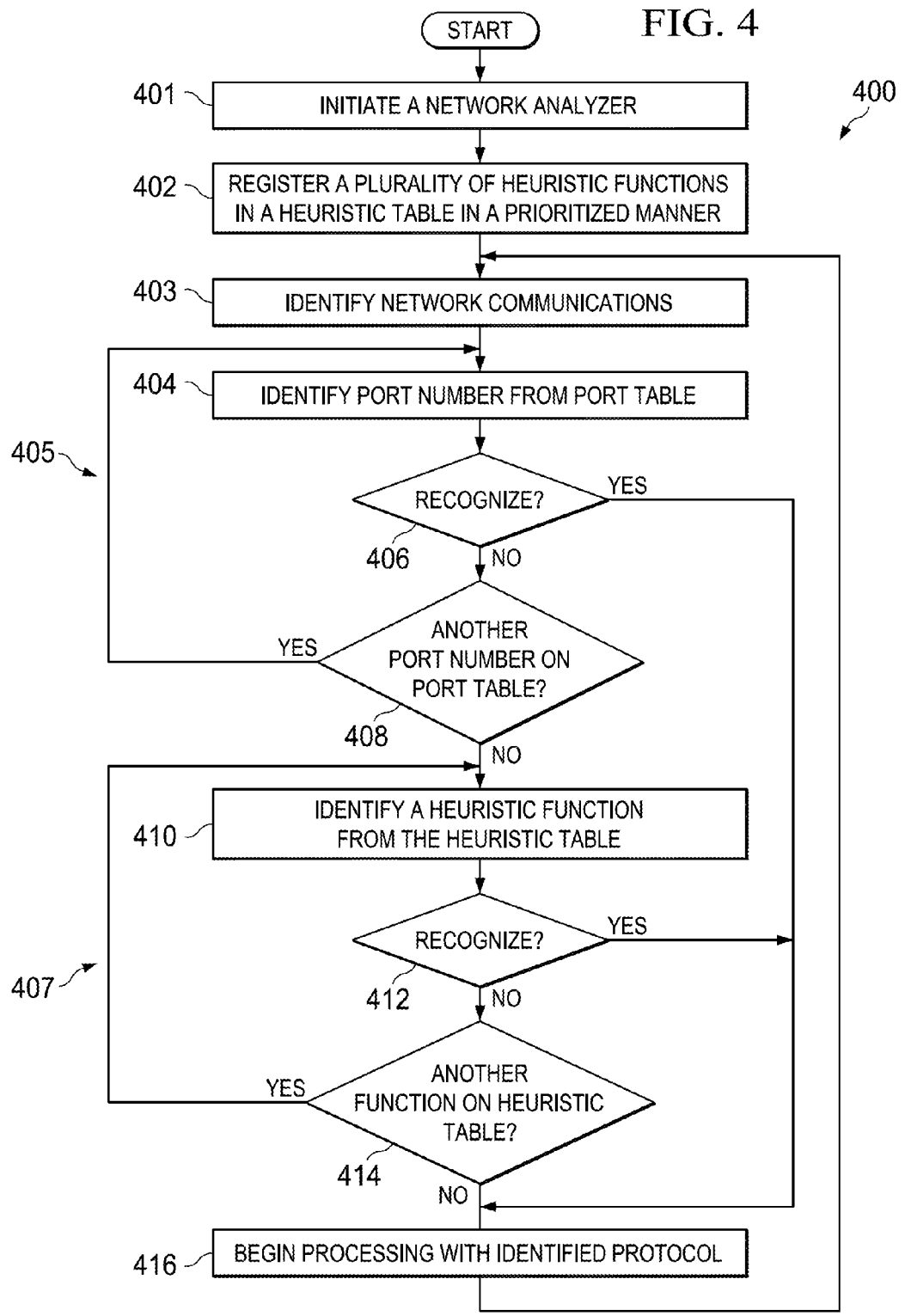
FIG. 4 illustrates a method for heuristically identifying protocols during network analysis utilizing a network analyzer, in accordance with one embodiment.

FIG. 4 illustrates a method 400 for heuristically identifying protocols during network analysis utilizing a network analyzer, in accordance with one embodiment. In one embodiment, the method 400 may be implemented in the context of the aforementioned framework of FIGS. 1-3. Of course, the present method 400 may be implemented in any desired context.

Initially, in operation 401, a network analyzer such as the one of FIGS. 1-3 is initiated. This may be accomplished upon installation of the network analyzer or booting up an associated platform. In response to the initiation of the network analyzer, various functions are carried out using each protocol interpreter module or component thereof (i.e. a registration module) associated with the network analyzer. See Table 1. These registration facilities may be invoked for each protocol as the associated protocol interpreter module is loaded into memory from a disk directory where the network analyzer is located.

TABLE 1

Register the protocol and its layer information (network, transport, etc.)
Identify the name and suite to which the protocol belongs
Assign a short name to the protocol
Identify the entry point to the protocol interpreter
Supply "HOWTO" flags for the SAR processing
Specify the length of a protocol data unit (PDU) header In addition to these capabilities, callback functions for specialized tasks can be registered with the SAR engine. In particular, a heuristic table may be populated or registered with prioritized heuristic functions in response to the initiation of the network analyzer. See operation 402. The specific heuristic functions that are populated and prioritized may be predetermined, or dynamically determined on a case-by-case basis.

For example, such heuristic table population may be based on user input, a specific configuration dictated by the associated protocol interpreter module, or in any desired manner. While the present embodiment provides for a dynamically populated and re-populated heuristic table, it should be noted that the table may be hard-wired per the desires of the user. FIG. 5 illustrates an exemplary heuristic table 500 including a plurality of heuristic function calls 504 with an associated priority 502.

With continuing reference to FIG. 4, network communications are received in operation 403 utilizing the network analyzer. Again, such network communications may include frames, packets, and/or any aspect of communications over a network, etc. Next, a first sub-process 405 is conducted utilizing a registered port table of the protocol interpreter module. While the registered port table may take any form, FIG. 6 illustrates an exemplary registered port table 600 including a plurality of registered or "well known" ports 602 with an associated protocol 604. In one embodiment, the registered port table 600 may be hard-wired. Of course, the registered port table 600 may be dynamically populated or registered per the desires of the user.

During the first sub-process 405, a port number is selected from the registered port table by the protocol interpreter module. See operation 404. Thereafter, an attempt is made to identify a protocol associated with the network communications based on the currently selected port number. Note decision 406. In other words, if a port number of the network communications matches the currently selected port number, it is ascertained that the protocol corresponding with the port number (based on the registered port table) is associated with the current network communications.

Operations 404 and 406 are repeated until the protocol associated with the network communications is identified, or there are no more registered ports in the corresponding table to test (see decision 408). If the protocol is identified, processing in the form of sequencing and/or reassembly is carried out using a SAR module. In addition, summary, detail, and hexadecimal display of the results may also be depicted. Note operation 416.

If the protocol is not identified utilizing the first sub-process 405, a second sub-process 407 is conducted utilizing a heuristic table. For example, a heuristic table like the one shown in FIG. 5 may be used. It should be noted, however, that the heuristic table may take any form.

During the second sub-process 407, a heuristic function is selected from the heuristic table based on the priority thereof using the protocol interpreter module, as indicated in operation 410. As an option, higher priority heuristic functions may be called prior to those with a lower priority. An attempt is then made to identify the protocol associated with the network communications based on the currently called heuristic function. See decision 412.

To accomplish this, the protocol interpreter module may validate whether a packet type of the network communications is within a specified range, and the associated packet size is appropriate for a particular protocol. Other tests may be conducted depending on the packet type, last packet indicator, and other fields as necessary. The foregoing analysis may return a TRUE response if the packet can be identified as a particular protocol, or a FALSE response otherwise. See again decision 412.

Operations 410 and 412 are repeated until the protocol associated with the network communications is identified, or there are no more heuristic functions in the corresponding table to test (see decision 414). If the protocol is identified, processing in the form of sequencing and/or reassembly is carried out using a SAR module coupled to the protocol interpreter module. Note operation 416.

Figure 7B:
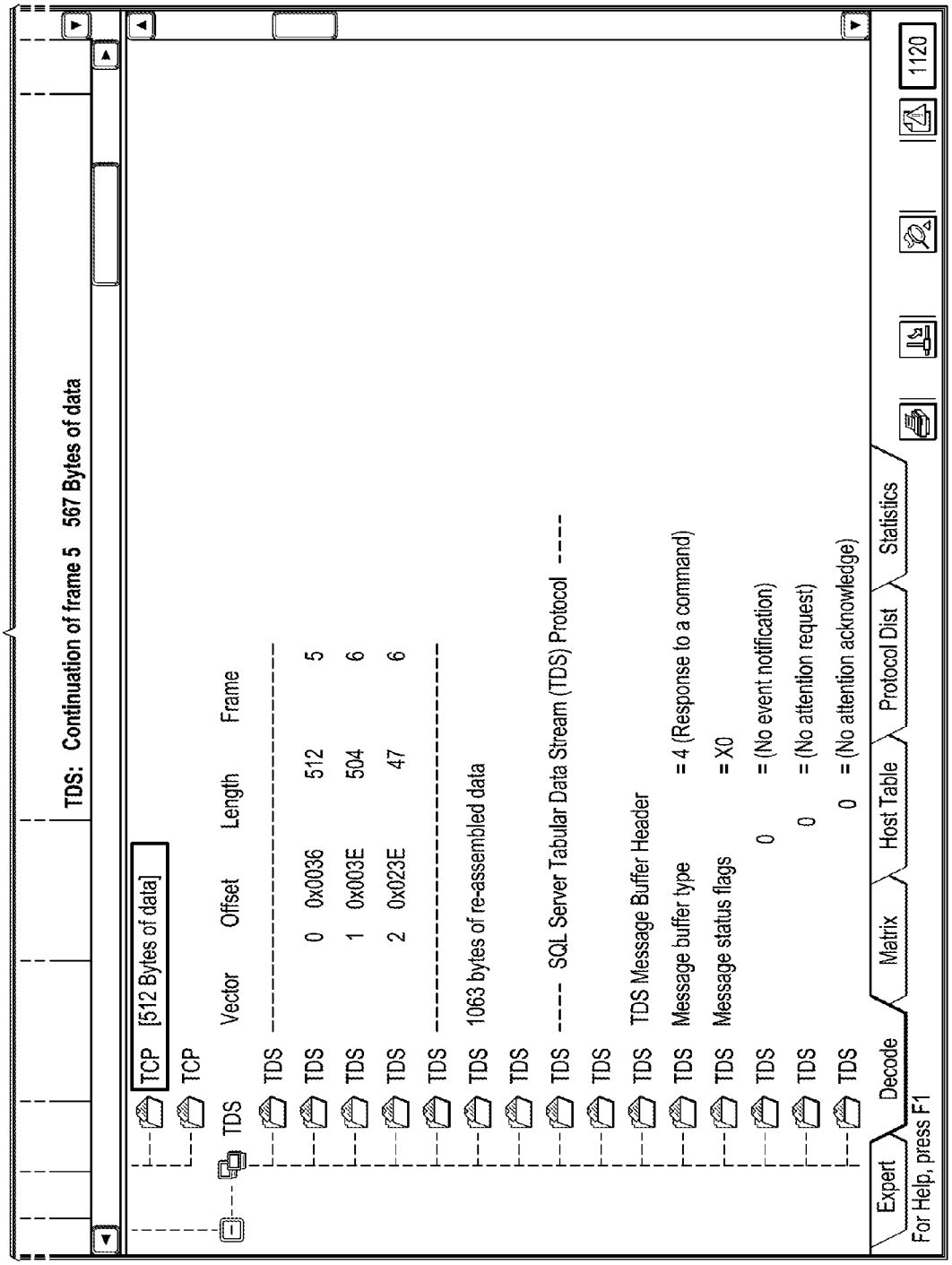
FIG. 7 shows a sample decode user interface generated utilizing a system with heuristic functions built into a protocol interpreter module thereof.

FIG. 7 shows a sample decode user interface 700 generated utilizing a system with heuristic functions built into a protocol interpreter module thereof. To illustrate the process of reassembly and various heuristic functions, six frames are shown extracted from a trace file associated with a particular server (i.e. Sybase®/Microsoft®SQL Server). The protocol associated with the server is called tabular data stream (TDS). This name is registered when the protocol is loaded by the SAR module. The sample consists of six frames including a login and simple query.

Table 2 illustrates various features of the frames of the exemplary decode user interface of FIG. 7.

TABLE 2

Frames 1-2: The login record spans frames 1 and 2. If one were to look at the detail for frame 1, he or she would see a vector list consisting of 512 bytes from frame 1 and 64 bytes from frame 2. The server requires 576 bytes to process a login request.
Frame 3 is the response to the login request and is totally self-contained. All 203 bytes of the response are contained in the frame.
Frame 4 is a "Language command," which is entirely contained in the frame. One can see the test of the SQL statement in the detail window.
Frame 5 is the first frame of the response to the command. It is the beginning of a multi-frame PDU, consisting of frames 5 and 6. The detail window shows the vector list. As is seen, the PDU consists of 512 bytes from frame 5 and two vectors from frame 6. This is a result of stripping out header information in continuation frames, which was done by the TDS protocol interpreter. It should be noted that the summary window indicates that frame 6 is a continuation of frame 5 with 567 bytes of data. However, the vector list for frame 6 only shows 504 + 47 = 551 bytes of data. The stripped headers account for the missing 16 bytes. They are in the frame, but not decoded as part of the response to the command. What is not shown in the figure is the fact that the first query returned 19 rows of data and the second returned 14.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A non-transitory computer readable medium, comprising:
    an engine software module for at least one of sequencing and reassembling network communications; and
    a plurality of protocol interpreter software modules coupled to the engine software module for identifying protocols associated with network communications, wherein each of the plurality of protocol interpreter software modules is adapted for identifying a particular protocol associated with a network communication based on a port number associated with the network communication, and heuristically identifying the particular protocol associated with a network communication using a plurality of heuristic functions if the particular protocol is not identified via the port number, the heuristic functions being organized based on priorities of the heuristic functions, and wherein the priorities are used to call the heuristic functions in a specific order until the particular protocol is identified; and
    wherein each of the plurality of protocol interpreter modules is further adapted for registering the protocol interpreter software module with the engine software module and indicating to the engine software module how the particular protocol is to be reassembled by the engine software module, and wherein registering the protocol interpreter software module with the engine software module includes registering a heuristic table including the plurality of heuristic functions and the associated priorities with the engine software module.

2. The computer readable medium of claim 1, wherein the port number is provisioned in a registered port table that is systematically used to evaluate the particular protocol.

3. The computer readable medium of claim 1, wherein the heuristic functions are provisioned in a table which is organized based on the priorities of the heuristic functions.

4. The computer readable medium of claim 1, wherein the network communication corresponding to the particular protocol is passed to the engine module for subsequent sequencing and reassembling.

5. The computer readable medium of claim 1, wherein the heuristic functions that are provisioned are predetermined.

6. The computer readable medium of claim 1, wherein the heuristic functions that are provisioned are dynamically determined.

7. The computer readable medium of claim 1, wherein, in response to initiation of the system, a plurality of functions are carried out including:
    registering a first protocol and associated layer information,
    identifying a name and suite to which the first protocol belongs,
    assigning another name to the first protocol,
    identifying an entry point to the protocol interpreter, and
    specifying a length of a protocol data unit (PDU) header.

8. A network analyzer comprising:
    a memory configured to store data, and
    a processor operable to execute instructions associated with the data, the network analyzer being configured to:
        register at least one of a plurality of protocol interpreter software modules with an engine software module for identifying protocols associated with network communications, wherein each of the plurality of protocol interpreter software modules is adapted for identifying a particular protocol associated with a network communication based on a port number associated with the network communication, and wherein registering the at least one protocol interpreter software module with the engine software module includes registering a heuristic table including the plurality of heuristic functions and the associated priorities with the engine software module;
        indicate, by the at least one protocol interpreter software module, to the engine software module how the particular protocol is to be reassembled by the engine software module;
        receive a network communication;
        identify a particular protocol associated with the network communication based on a port number associated with the network communication; and
        heuristically identify the particular protocol associated with the network communication using a plurality of heuristic functions if the particular protocol is not identified via the port number, the heuristic functions being organized based on priorities of the heuristic functions, and wherein the priorities are used to call the heuristic functions in a specific order until the particular protocol is identified.

9. The network analyzer of claim 8, wherein the port number is provisioned in a registered port table that is systematically used to evaluate the particular protocol.

10. The network analyzer of claim 8, wherein the heuristic functions are provisioned in a table which is organized based on the priorities of the heuristic functions.

11. The network analyzer of claim 8, wherein the network analyzer is further configured to sequence and reassemble the network communication corresponding to the particular protocol.

12. The network analyzer of claim 8, wherein the heuristic functions that are provisioned are predetermined.

13. The network analyzer of claim 8, wherein the heuristic functions that are provisioned are dynamically determined.

14. A method, comprising:
registering at least one of a plurality of protocol interpreter software modules with an engine software module for identifying protocols associated with network communications, wherein each of the plurality of protocol interpreter software modules is adapted for identifying a particular protocol associated with a network communication based on a port number associated with the network communication, and wherein registering the at least one protocol interpreter software module with the engine software module includes registering a heuristic table including the plurality of heuristic functions and the associated priorities with the engine software module;
indicating, by the at least one protocol interpreter software module, to the engine software module how the particular protocol is to be reassembled by the engine software module;
receiving a network communication;
identifying a particular protocol associated with a network communication based on a port number associated with the network communication; and
heuristically identifying the particular protocol associated with the network communication using a plurality of heuristic functions if the particular protocol is not identified via the port number, the heuristic functions being organized based on priorities of the heuristic functions, and wherein the priorities are used to call the heuristic functions in a specific order until the particular protocol is identified.

15. The method of claim 14, wherein the port number is provisioned in a registered port table that is systematically used to evaluate the particular protocol.

16. The method of claim 14, wherein the heuristic functions are provisioned in a table which is organized based on the priorities of the heuristic functions.

17. The method of claim 14, wherein the network communication corresponding to the particular protocol is passed for subsequent sequencing and reassembling.

18. The method of claim 14, wherein the heuristic functions that are provisioned are predetermined.

19. The method of claim 14, wherein the heuristic functions that are provisioned are dynamically determined.

20. The computer readable medium of claim 1, wherein each of the plurality of protocol interpreter software modules is further adapted for being selectively enabled.

21. The network analyzer of claim 8, wherein each of the plurality of protocol interpreter software modules is further adapted for being selectively enabled.

22. The method of claim 14, wherein each of the plurality of protocol interpreter software modules is further adapted for being selectively enabled.

23. The computer readable medium of claim 1, wherein the engine software module is adapted for reassembling the network communication according to the identified particular protocol.

24. The network analyzer of claim 8, wherein the engine software module is adapted for reassembling the network communication according to the identified particular protocol.

25. The method of claim 14, wherein the engine software module is adapted for reassembling the network communication according to the identified particular protocol.

* * * * *